United States Patent
Chiu

(10) Patent No.: US 10,823,270 B2
(45) Date of Patent: Nov. 3, 2020

(54) DOUBLE ROW ROLLER CAM TRANSMISSION MECHANISM WITH BACKLASH ADJUSTMENT MEANS

(71) Applicant: Chui-Tsai Chiu, Taoyuan (TW)

(72) Inventor: Chui-Tsai Chiu, Taoyuan (TW)

( * ) Notice: Subject to any disclaimer, the term of this patent is extended or adjusted under 35 U.S.C. 154(b) by 51 days.

(21) Appl. No.: 16/416,228

(22) Filed: May 19, 2019

(65) Prior Publication Data

US 2019/0360574 A1 Nov. 28, 2019

(30) Foreign Application Priority Data

May 23, 2018 (TW) ............................. 107206785 U

(51) Int. Cl.
*F16H 55/24* (2006.01)
*F16H 1/16* (2006.01)

(52) U.S. Cl.
CPC ............ *F16H 55/24* (2013.01); *F16H 1/166* (2013.01)

(58) Field of Classification Search
CPC .................................. F16H 55/24; F16H 1/166
See application file for complete search history.

(56) References Cited

U.S. PATENT DOCUMENTS

| | | | | |
|---|---|---|---|---|
| 3,597,990 A * | 8/1971 | McCartin | ................ | F16H 55/10 74/415 |
| 3,766,800 A * | 10/1973 | Kennedy | ............ | F16H 25/2261 74/424.93 |
| 4,685,346 A * | 8/1987 | Brackett | ................ | F16H 1/166 74/427 |
| 4,833,934 A * | 5/1989 | Boyko | .................... | F16H 1/166 384/454 |
| 4,955,243 A * | 9/1990 | Kato | ....................... | F16H 25/14 267/64.11 |
| 5,097,718 A * | 3/1992 | Sahara | ..................... | B23Q 5/56 384/255 |
| 5,381,704 A * | 1/1995 | Knotts | ...................... | F16H 1/12 74/416 |
| 5,704,248 A * | 1/1998 | Knotts | ...................... | F16H 1/12 248/562 |
| 6,279,219 B1 * | 8/2001 | Ohsawa | .................. | B23P 19/04 29/407.01 |
| 6,598,708 B2 * | 7/2003 | St-Germain | ............ | B66B 9/025 182/142 |
| 6,862,786 B2 * | 3/2005 | Kato | ....................... | B23Q 1/38 29/38 B |
| 8,302,502 B2 * | 11/2012 | Carrier | ................... | F16H 1/166 74/415 |

* cited by examiner

*Primary Examiner* — David M Fenstermacher

(57) ABSTRACT

A double row roller cam transmission mechanism with backlash adjustment means is disclosed to include two passive wheels respectively provided with rollers, a transmission shaft with a spiral protrusion, and an adjustment device set operable to adjust the relative position between the two passive wheels so that the rollers of the two passive wheels can be respectively and positively abutted against the two opposite surfaces of the spiral protrusion of the transmission shaft to eliminate the backlash between the rollers and the spiral protrusion and to increase structural rigidity and transmission load.

10 Claims, 7 Drawing Sheets

DOUBLE ROW ROLLER CAM TRANSMISSION MECHANISM WITH BACKLASH ADJUSTMENT MEANS

BACKGROUND OF THE INVENTION

1. Field of the Invention

The present invention relates to cam transmission technology and more particularly, to a double row roller cam transmission mechanism with backlash adjustment means, which provides an adjustment device set that can be operated to adjust the relative position between two passive wheels so that the two passive wheels can be respectively and positively abutted against the two opposite surfaces of the spiral protrusion of the transmission shaft to eliminate the backlash between the two passive wheels and the spiral protrusion of the transmission shaft.

2. Description of the Related Art

When the cam transmission mechanism is operated at high speed, the inertia load is large, so it is easy to generate negative torque. If there is a backlash between the cam and the rollers, a knock will occur and vibration will be generated, reducing the transmission efficiency and accuracy and shortening the service life of the cam. Therefore, the relevant industry has divided the cam into two cam members that can be moved away from each other in different directions, so that the rollers on the rotating wheel respectively abut against the two cam members, thereby eliminating the backlash. However, in order to maintain the relative position of the two cam members, it is necessary to use a shaft coupling to connect the two cam members. Due to the presence of the shaft coupling between the two cam members, adjusting the backlash becomes more difficult. Further, the use of two cam members relatively increases the inertial load of the cam and shortens the service life of the cam.

SUMMARY OF THE INVENTION

The present invention has been accomplished under the circumstances in view. It is therefore the main object of the present invention to provide a double row roller cam transmission mechanism with backlash adjustment means, which comprises two passive wheels respectively provided with rollers, a transmission shaft with a spiral protrusion, and an adjustment device set. The adjustment device set can be operated to adjust the relative position between the two passive wheels so that the rollers of the two passive wheels can be respectively and positively abutted against the two opposite surfaces of the spiral protrusion of the transmission shaft to eliminate the backlash between the rollers and the spiral protrusion, thereby reducing the inertial load of the spiral protrusion and increasing structural rigidity and transmission load.

DETAILED DESCRIPTION OF THE PREFERRED EMBODIMENTS

Figure 1:
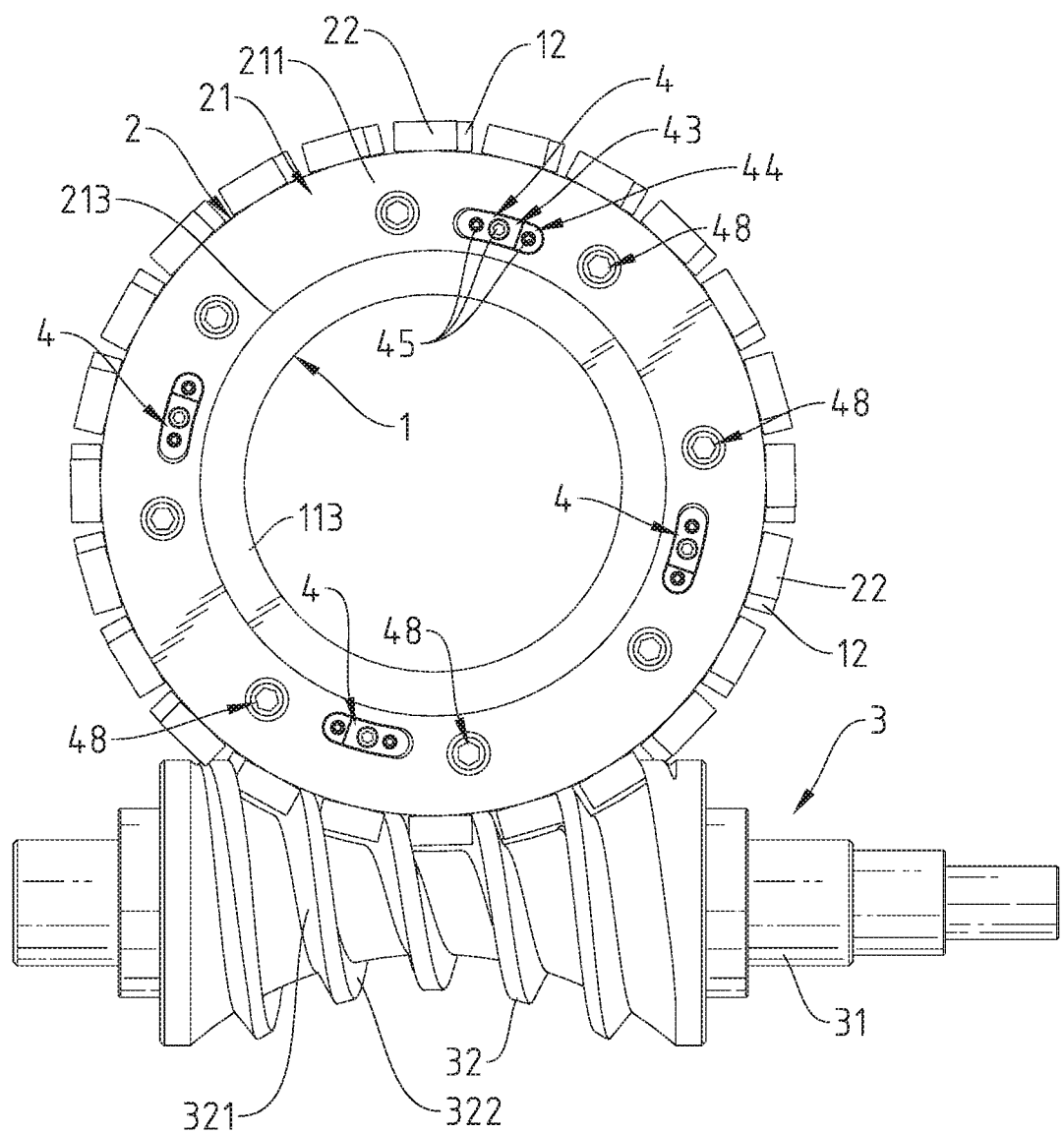
FIG. 1 illustrates the outer appearance of a double row roller cam transmission mechanism with backlash adjustment means in accordance with the present invention.
Figure 2:
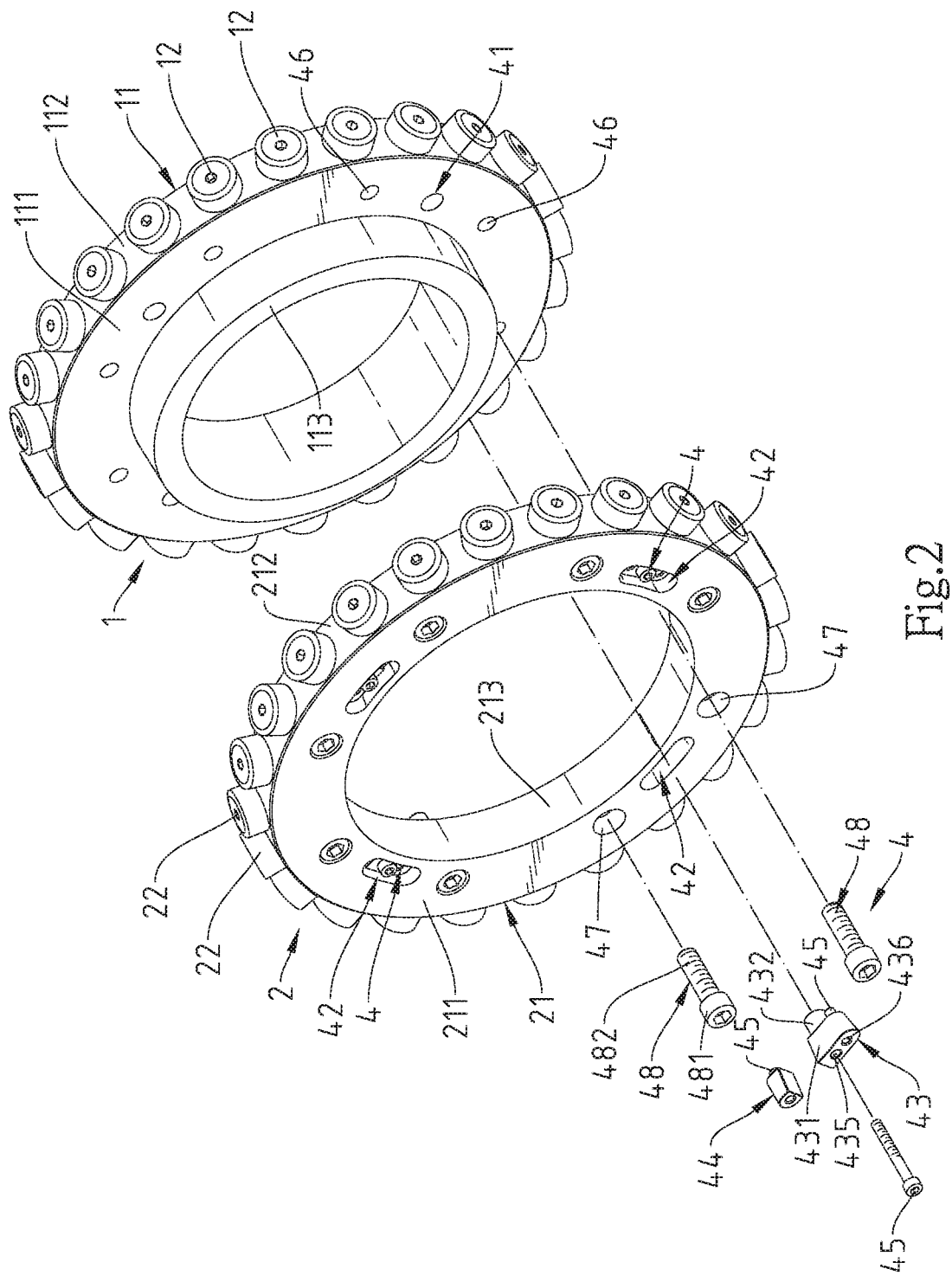
FIG. 2 is an exploded view of a part of the present invention with the transmission shaft excluded.
Figure 3:
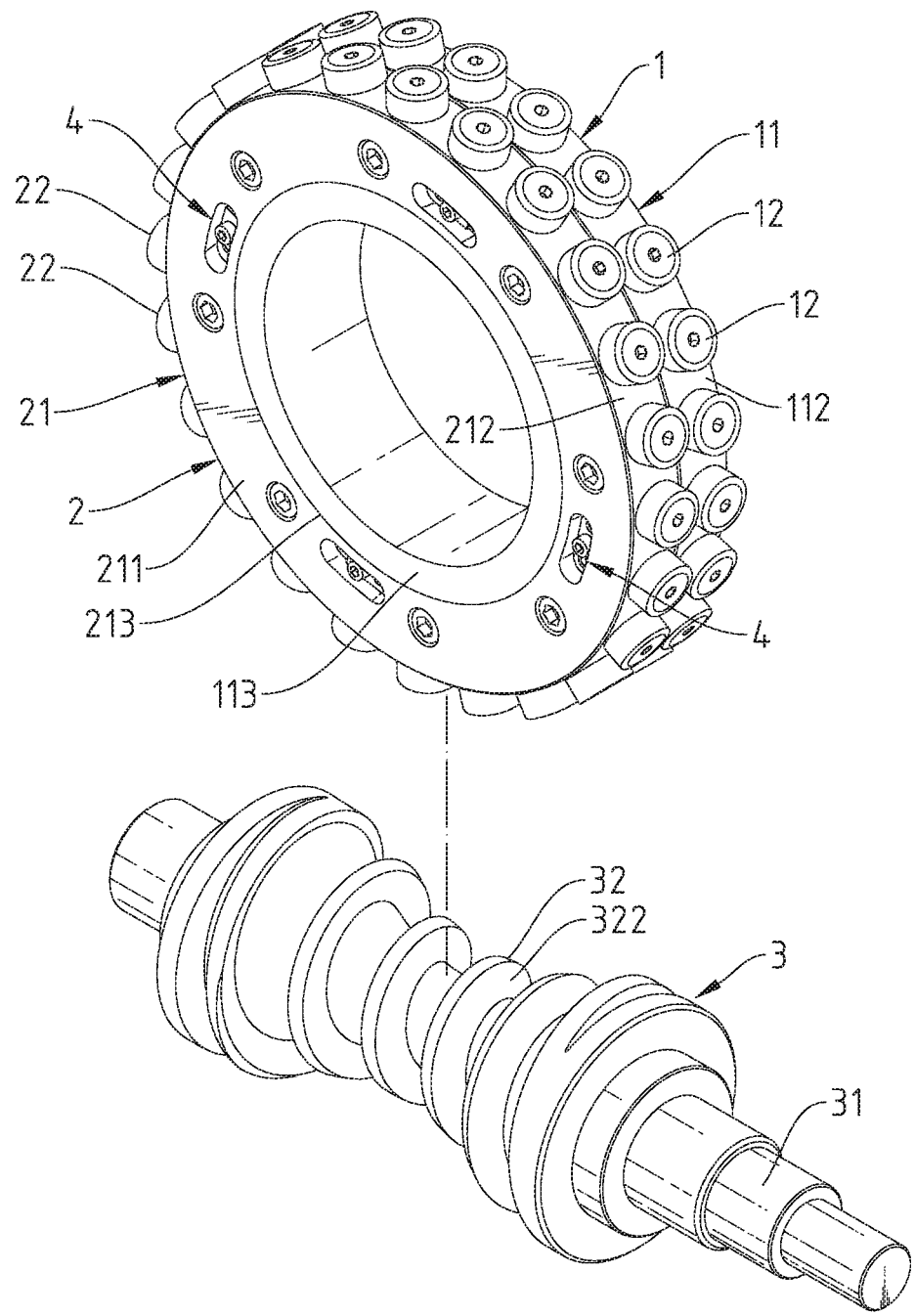
FIG. 3 is an exploded view of the first and second passive wheels and the transmission shaft.
Figure 4:
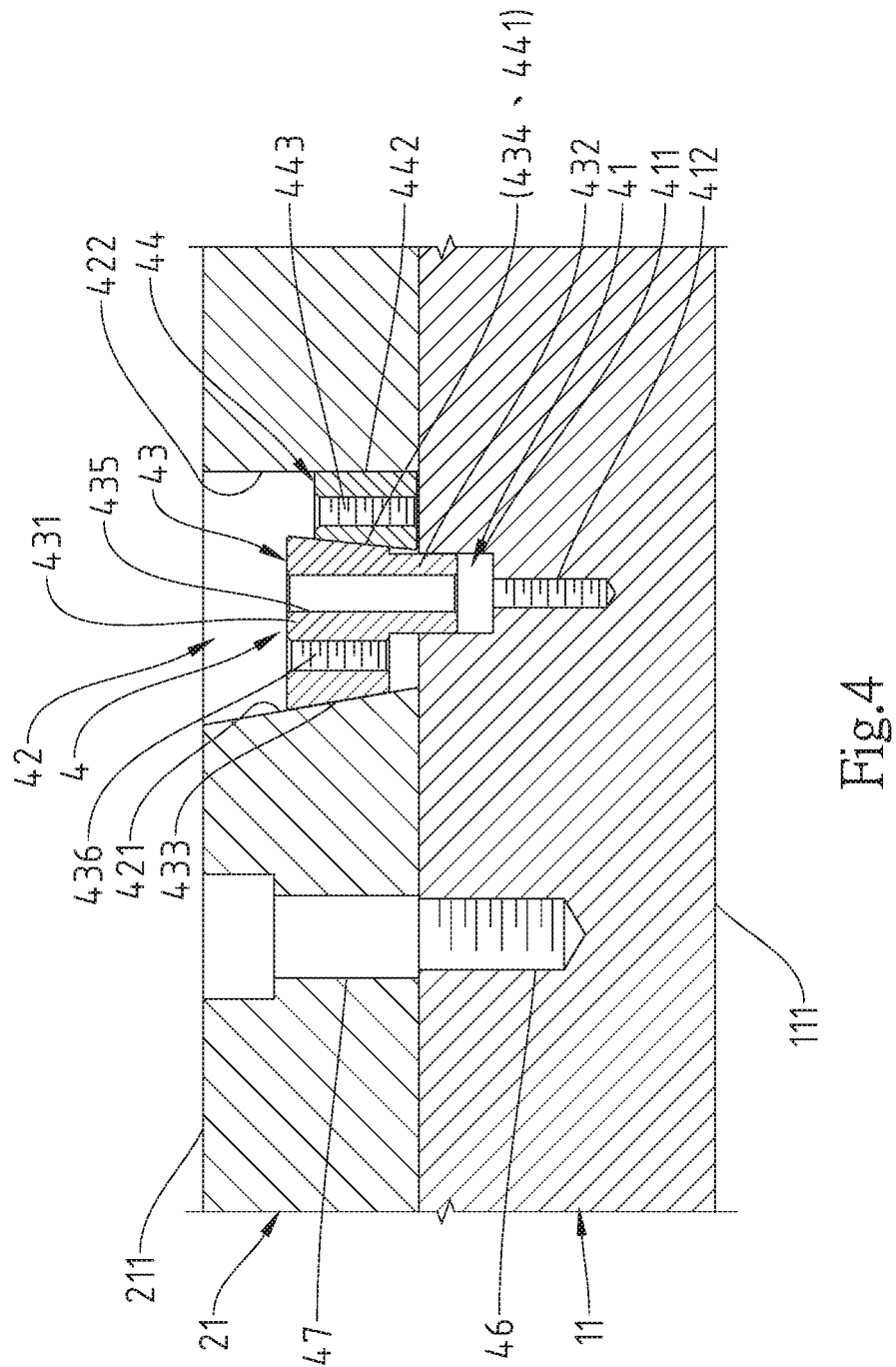
FIG. 4 is a sectional view, in an enlarged scale, of a part of the double row roller cam transmission mechanism with backlash adjustment means in accordance with the present invention.
Figure 5:
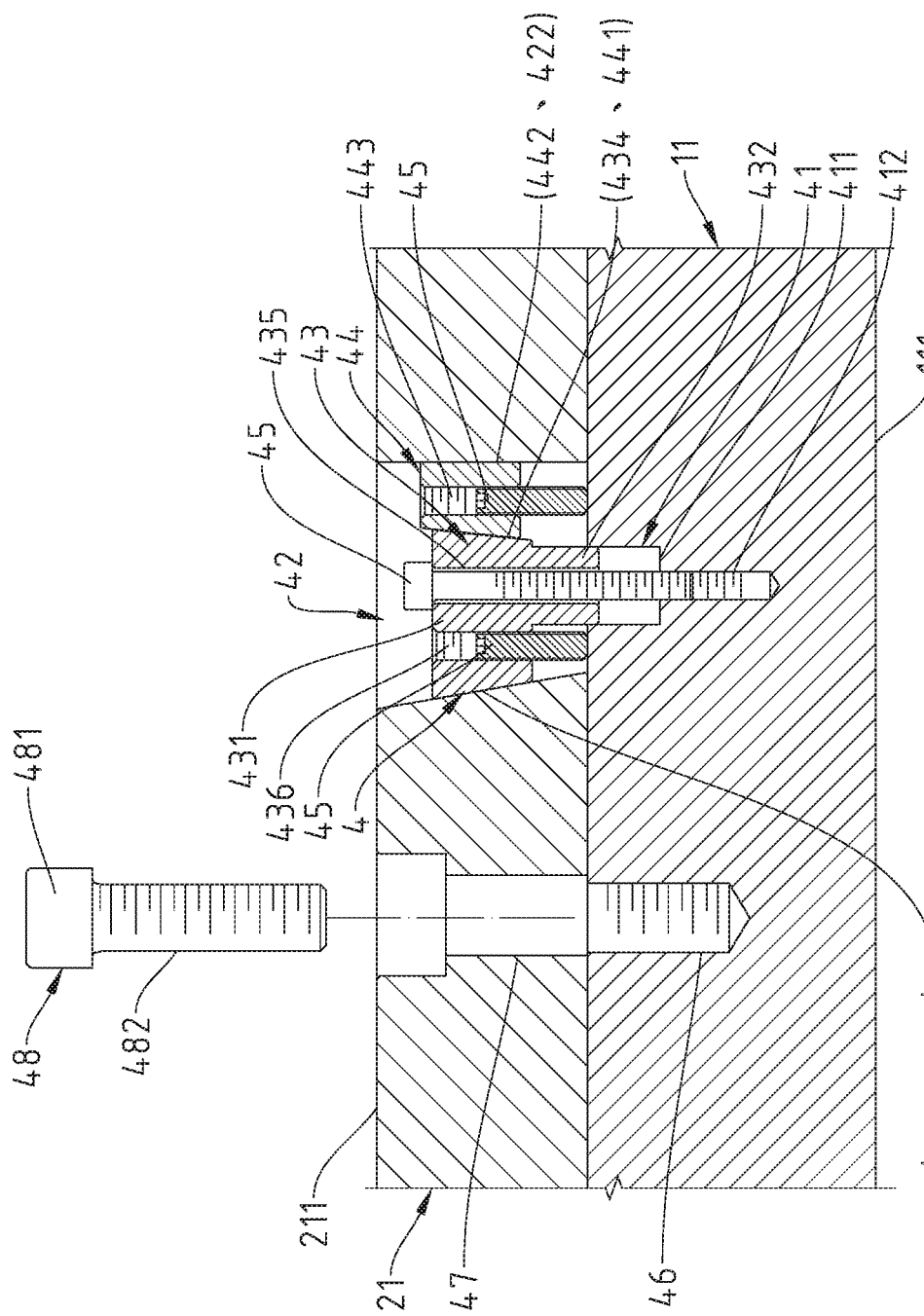
FIG. 5 is a schematic drawing of the present invention, illustrating a backlash adjustment operation.
Figure 6:
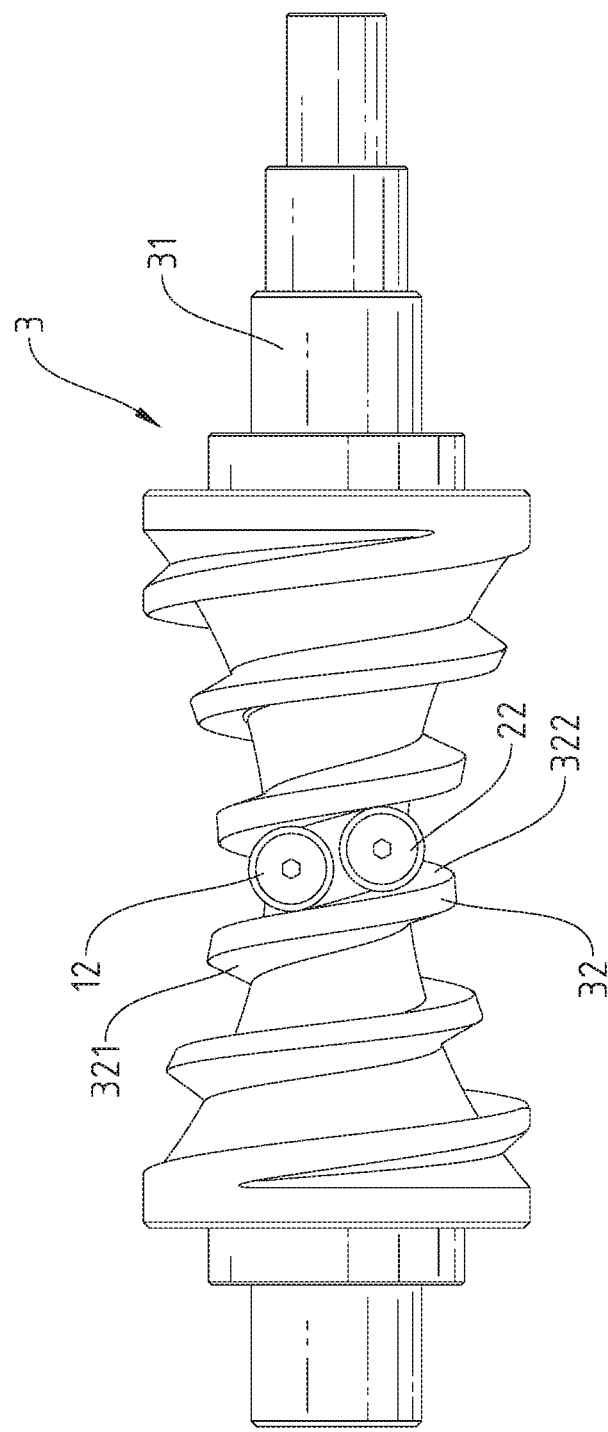
FIG. 6 is a schematic drawing, showing the rollers abutted against the spiral protrusion of the transmission shaft.

Referring to FIGS. 1-5, a double row roller cam transmission mechanism with backlash adjustment means in accordance with the present invention is shown. The double row roller cam transmission mechanism with backlash adjustment means comprises a first passive wheel 1, a second passive wheel 2, a transmission shaft 3 and an adjustment device set 4.

The first passive wheel 1 comprises a first rotating wheel 11 and a plurality of first rollers 12. The first rotating wheel 11 comprises a first wheel body 111, a first connection surface 112 formed of an outer peripheral surface of the first wheel body 111, and a shaft portion 113 perpendicularly extended from one lateral side of the first wheel body 111. The first rollers 12 are pivotally disposed around the first connection surface 112 of the first rotating wheel 11.

The second passive wheel 2 comprises a second rotating wheel 21 and a plurality of second rollers 22. The second rotating wheel 21 comprises a second wheel body 211, a second connection surface 212 formed of an outer peripheral surface of the second wheel body 211, and a shaft hole 213 cut through two opposite lateral sides of the second wheel body 211. The second rollers 22 are pivotally disposed around the second connection surface 212 of the second rotating wheel 21. The shaft hole 213 of the second wheel body 211 is pivotally coupled to the shaft portion 113 of the first wheel body 111 to keep the cross section of the second connection surface 212 of the second passive wheel 2 in parallel to the cross section of the first connection surface 112 of the first passive wheel 1.

The transmission shaft 3 is disposed adjacent to the first passive wheel 1 and the second passive wheel 2, comprising a shaft body 31 and a spiral protrusion 32 integrally formed with and extended around the periphery of the shaft body 31. The spiral protrusion 32 defines an inner surface 321 and an opposing outer surface 322. The inner surface 321 is abutted against the first rollers 12 of the first passive wheel 1. The outer surface 322 is abutted against the second rollers 22 of the second passive wheel 2.

The adjustment device set 4 comprises a plurality of locating holes 41, a plurality of adjustment holes 42, a plurality of adjusting members 43, a plurality of locating members 44, and a plurality of positioning screw rods 45. The locating holes 41 respectively consist of an adjustment groove 411 that is located on the first wheel body 111 to face toward the second wheel body 211 and a first screw hole 412 that is formed in a bottom wall of the adjustment groove 411. The adjustment holes 42 cut through two opposite sides of the second wheel body 211 of the second passive wheel 2 and are respectively disposed in axial alignment with the locating holes 41, each defining a first bearing surface 421 and an opposed second bearing surface 422. The first bearing surface 421 is inclined so that the distance between the first bearing surface 421 and second bearing surface 422 of each adjustment hole 42 reduces gradually in direction toward the first wheel body 111. The adjusting members 43 are respectively mounted in the adjustment holes 42, each comprising an adjusting portion 431, a positioning portion 432 downwardly extended from a bottom side of the adjusting portion 431, a position-limiting hole 435 cut through the adjusting portion 431 and the positioning portion 432, and a second screw hole 436 cut through the adjusting portion 431 in a parallel manner relative to the position-limiting hole 435 and disposed outside the positioning portion 432. Each position-limiting hole 435 has one respective positioning screw rod 45 mounted therein and the first positioning screw rod 45 is threaded into one respective first screw hole 412. Each second screw hole 436 has one respective positioning screw rod 45 mounted therein. The positioning portion 432 is placed in one respective locating hole 41. The adjusting portion 431 defines a first lateral side 433 and an opposed second lateral side 434. The first lateral side 433 and the second lateral side 434 are all inclined. The first lateral side 433 is abutted against the first bearing surface 421 of one respective adjustment hole 42. The first lateral side 433 has the same slope as the first bearing surface 421 of each adjustment hole 42. Each locating member 44 is disposed between one respective adjusting member 43 and the second bearing surface 422 of one respective adjustment hole 42. Each locating member 44 comprises a third screw hole 443. The third screw hole 443 has one respective positioning screw rod 45 mounted therein. Each locating member 44 defines a third lateral side 441 and an opposed fourth lateral side 442. The third lateral side 441 is inclined and abutted against the second lateral side 434 of the adjusting portion 431 of one respective adjusting member 43. The fourth lateral side 442 is abutted against the second bearing surface 422 of one respective adjustment hole 42. Further, the second lateral side 434 of the adjusting member 43 has the same slope as the third lateral side 441 of each locating member 44.

Please refer to FIG. 2 and FIGS. 4-6. As can be clearly seen from the drawings, when the backlash adjustment is performed, the positioning screw rod 45 in the second screw hole 436 of the respective adjusting members 43 is first rotated to press the end of the positioning screw rod 45 against the surface of the first wheel body 111, causing the respective adjusting member 43 to move up and down. Since the positioning portion 432 of the adjusting member 43 is located in the respective locating hole 41, the positioning of the respective positioning screw rod 45 prohibits the respective adjusting member 43 from lateral displacement. When the adjusting member 43 moves upward, the distance between the first bearing surface 421 and the first lateral side 433 increases gradually. After adjustment of the adjusting member 43 to the proper position, rotate the positioning screw rod 45 in the third screw hole 443 into abutment against the first wheel body 111, causing the respective locating member 44 to move toward the respective adjusting member 43. When the third lateral side 441 and the second lateral side 434 are abutted against each other, the fourth lateral side 442 pushes the second bearing surface 422, causing rotation of the second rotating wheel 21 relative to the first rotating wheel 11 till that the first bearing surface 421 is abutted against the first lateral side 433. At this time, the first bearing surface 421 and the first lateral side 433, the second lateral side 434 and the third lateral side 441, and the fourth lateral side 442 and the second bearing surface 422 are respectively abutted against each other, achieving relative positioning between the first rotating wheel 11 and the second rotating wheel 21. Thus, clearance between the first roller 12 and the inner surface 321 and clearance between the second roller 22 and the outer surface 322 are eliminated, enhancing relative positioning between the first passive wheel 1 and the second passive wheel 2.

Referring to FIG. 4 again, the adjustment device set 4 further comprises a plurality of locking screw holes 46, a plurality of countersunk holes 47 and a plurality of locking members 48. The locking screw holes 46 are equiangularly located on the first wheel body 111. The countersunk holes 47 cut through the two opposite lateral sides of the second wheel body 211 and respectively aimed at the locking screw holes 46. The locking members 48 are made in the form of a lock screw, each comprising a head 481 and a threaded shank 482 extended from a bottom side of the head 481. When the first rotating wheel 11 and the second rotating wheel 21 form a positioning state, the threaded shank 482 of each locking member 48 is inserted through the respective countersunk hole 47 and threaded into the respective locking screw hole 46, enabling the head 481 to be pressed in the respective countersunk hole 47 to lock the first rotating wheel 11 and the second rotating wheel 21.

Figure 7:
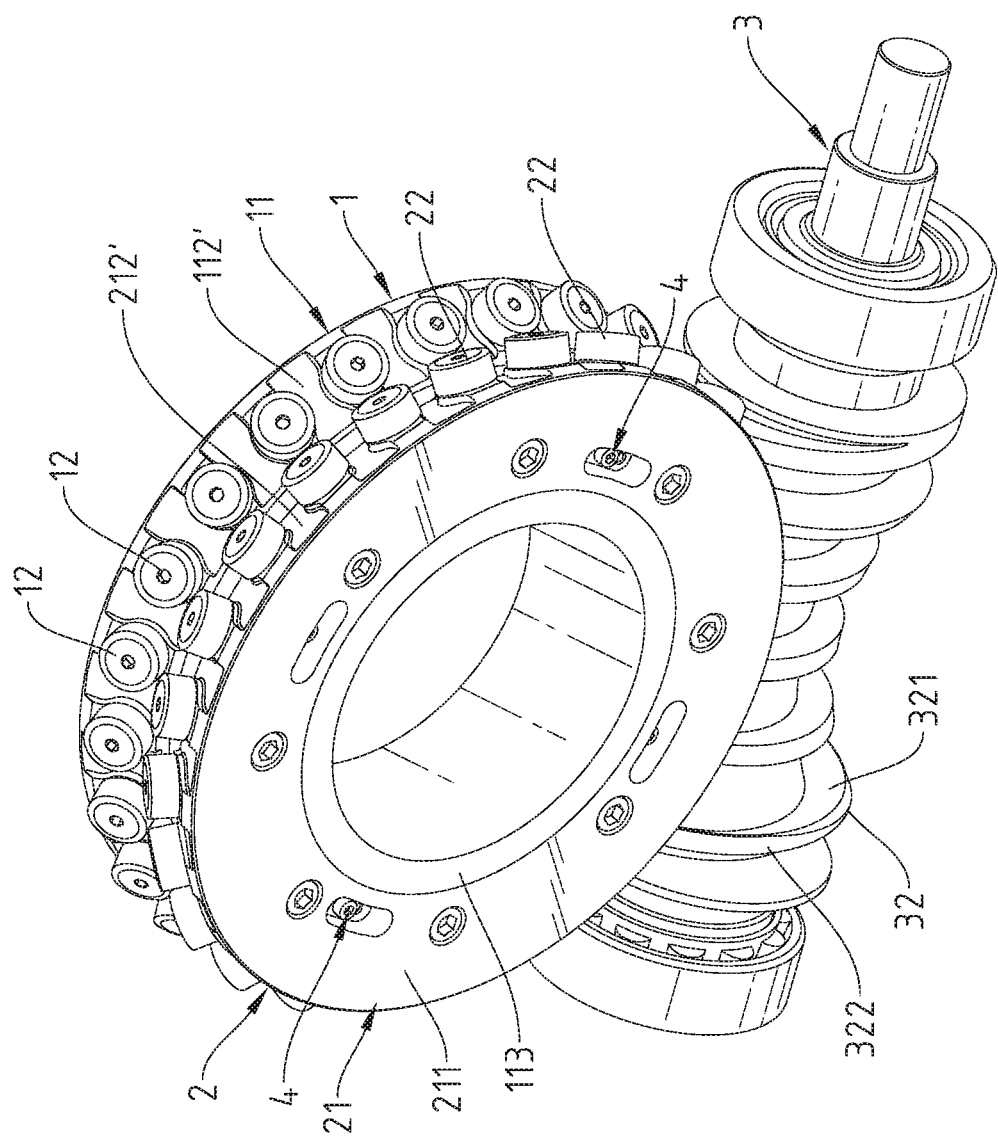
FIG. 7 is an oblique top elevational view of an alternate form of the double row roller cam transmission mechanism with backlash adjustment means in accordance with the present invention.

Please refer to FIG. 7. It can be clearly seen from the drawing that a contained angle smaller than 180° is defined between the first connection surface 112' of the first passive wheel 1 and the second connection surface 212' of the second passive wheel 2. This design helps to stabilize the relative position between the first passive wheel 1, the second passive wheel 2 and the transmission shaft 3.

What the invention claimed is:

1. A double row roller cam transmission mechanism, comprising:

a first passive wheel comprising a first rotating wheel and a plurality of first rollers, said first rotating wheel comprising a first wheel body and a first connection surface formed of an outer peripheral surface of said first wheel body, said first rollers being pivotally disposed around said first connection surface of said first rotating wheel;

a second passive wheel comprising a second rotating wheel and a plurality of second rollers, said second rotating wheel comprising a second wheel body and a second connection surface formed of an outer peripheral surface of said second wheel body, said second rollers being pivotally disposed around said second connection surface of said second rotating wheel, said second wheel body being pivotally connected to said first wheel body of said first passive wheel in a parallel relationship;

a transmission shaft disposed adjacent to said first passive wheel and said second passive wheel, said transmission shaft comprising a shaft body and a spiral protrusion extended around the periphery of said shaft body, said spiral protrusion comprising an inner surface abutted against said first rollers of said first passive wheel and an opposed outer surface abutted against said second rollers of said second passive wheel; and an adjustment device set comprising a locating hole, an adjustment hole, an adjusting member and a locating member, said locating hole being located on said first wheel body of said first passive wheel adjacent to said second wheel body of said second passive wheel, said adjustment hole being located on said second wheel body of said second passive wheel and cut through two opposite sides of said second wheel body to aim at said locating hole, said adjustment hole defining a first bearing surface and an opposed second bearing surface, said first bearing surface being inclined so that the distance between said first bearing surface and said second bearing surface of said adjustment hole reduces gradually toward said first wheel body, said adjusting member being mounted in said adjustment hole, said adjusting member comprising an adjusting portion and a positioning portion downwardly extended from a bottom side of adjusting portion, said positioning portion being disposed in said locating hole, said adjusting portion comprising a first lateral side and an opposed second lateral side, said second lateral side being inclined, said first lateral side being abutted against said first bearing surface, said locating member being disposed between said adjusting member and said second bearing surface of said adjustment hole, said locating member comprising a third lateral side and an opposed fourth lateral side, said third lateral side being inclined and abutted against said second lateral side, said fourth lateral side being abutted against said second bearing surface.

2. The double row roller cam transmission mechanism as claimed in claim 1, wherein said first passive wheel further comprises a shaft portion perpendicularly extended from one lateral side of said first wheel body; said second passive wheel further comprises a shaft hole located on one lateral side of said second wheel body and pivotally coupled to said shaft portion of said first passive wheel.

3. The double row roller cam transmission mechanism as claimed in claim 1, wherein said first connection surface of said first passive wheel and said second connection surface of said second passive wheel are sectionally disposed in parallel.

4. The double row roller cam transmission mechanism as claimed in claim 1, wherein said first connection surface of said first passive wheel and said second connection surface of said second passive wheel defined therebetween a contained angle smaller than 180°.

5. The double row roller cam transmission mechanism as claimed in claim 1, wherein said first lateral side of said adjusting member is inclined, and the slope of said first lateral side is same as the slope of said first bearing surface of said adjustment hole so that said first lateral side is positively abutted against said first bearing surface.

6. The double row roller cam transmission mechanism as claimed in claim 1, wherein the slope of said second lateral side of said adjusting member is same as the slope of said third lateral side of said locating member.

7. The double row roller cam transmission mechanism as claimed in claim 1, wherein said locating hole is formed of an adjustment groove and a first screw hole, said adjustment groove being located on said first wheel body adjacent to said second wheel body, said first screw hole being located in a bottom side of said adjustment groove; said adjusting member further comprises a position-limiting hole cut through said adjusting portion and said positioning portion, and a positioning screw rod mounted in said position-limiting hole and threaded into said first screw hole.

8. The double row roller cam transmission mechanism as claimed in claim 7, wherein said adjusting member further comprises a second screw hole extended through said adjusting portion at one lateral side relative to said position-limiting hole, and a positioning screw rod mounted in said second screw hole and stopped against said first wheel body.

9. The double row roller cam transmission mechanism as claimed in claim 1, wherein each said locating member comprises a third screw hole, and a positioning screw rod mounted in said third screw hole and stopped against said first wheel body.

10. The double row roller cam transmission mechanism as claimed in claim 1, wherein said adjustment device set further comprises a locking screw hole, a countersunk hole and a locking member, said locking screw hole being located on said first wheel body, said countersunk hole being extended through said second wheel body and aimed at said locking screw hole, said locking member comprising a head and a threaded shank extended from one side of said head, said threaded shank being inserted through said countersunk hole and threaded into said locking screw hole, said head being pressed in said countersunk hole.

* * * * *